United States Patent [19]

Breznican

[11] 4,370,605
[45] Jan. 25, 1983

[54] TWO-SPEED MOTOR CONTROL

[75] Inventor: Stephen J. Breznican, New Kensington, Pa.

[73] Assignee: Westinghouse Electric Corp., Pittsburgh, Pa.

[21] Appl. No.: 182,922

[22] Filed: Sep. 2, 1980

[51] Int. Cl.$^3$ .............................................. H02P 5/40
[52] U.S. Cl. .................... 318/773; 318/779; 318/782; 62/158; 62/230; 361/22; 361/29
[58] Field of Search ............................ 318/773–776, 318/704, 778, 782, 779; 62/230, 158; 361/29, 22

[56] References Cited
U.S. PATENT DOCUMENTS
4,691,294   5/1978   Zankl et al. .................... 318/773

*Primary Examiner*—David Smith, Jr.
*Attorney, Agent, or Firm*—E. F. Possessky

[57] ABSTRACT

A motor control system includes a motor system having a pole-amplitude-modulated (PAM) motor, a motor breaker, and a speed switch coupled between the motor breaker and the PAM motor. The PAM motor is coupled to a fan in an exhaust duct having a controlled damper for controlling air flow therethrough. A control system step logic sequencer includes means responsive to permissive signals for providing in sequence control signals to the motor breaker and speed switch in response to confirmation signals received from the motor breaker, the speed switch and the PAM motor.

13 Claims, 9 Drawing Figures

TWO-SPEED MOTOR CONTROL

BACKGROUND OF THE DISCLOSURE

1. Field of the Invention

This invention relates to control systems for controlling the speed of electric motors, and in particular to two-speed motor control systems for controlling pole-amplitude-modulated (PAM) motor systems.

2. Description of the Prior Art

A pole-amplitude-modulated (PAM) motor is a two-speed electric motor having one set of motor windings designed so that the one set of windings can be reconfigured using a switching mechanism so as to achieve any two particular speeds in the PAM motor itself. Such a motor is advantageous in that it eliminates the requirement of a second set of motor windings to achieve a second speed thereby reducing the overall weight and size of the required motor. In addition, the PAM motor is energy efficient.

The components of a PAM motor system include, in one embodiment, a speed switch for effecting the reconfiguration of the motor windings and a motor breaker switch for electrically protecting the speed switch. It is important in this embodiment of a PAM motor system that, when changing the speed of the PAM motor, the motor breaker switch and the speed switch be operated, that is opened and closed, in the proper sequence. This is because, for example, back emf generated by the flux decay of the PAM motor may damage the speed switch if the sequence of operation is improper, that is, for example, if the speed switch is changed under motor load.

A control system is required for controlling the sequence of operation of the components of the PAM motor so as to assure safe and reliable operation. It is especially desirable that a control system be provided to a user along with the PAM motor so as to avoid requiring the user to design a control system which may not properly govern the operation of the PAM motor. For example, a user-designed control system may not include operating paths for all the possible contingent operating conditions to assure reliable and safe operation of the PAM motor either because the user is not aware of certain contingent operating conditions or because the user-designed system concept is faulty in that there are incomplete or improper system contingency operating paths.

One typical prior art control system includes digital logic and a grey code design having electronic timers for sequencing the operation of the components of the PAM motor system. Since a grey code is only valid where one digital bit at a time is changed from one digital word to another, the prior art grey code control system is limited in its flexibility to include a variety of contingencies in an operating path. This is because it might be desirable to follow a contingency operating path requiring a change of more than one digital bit. Such a change is invalid using a grey code. In addition, there have been possible race conditions in the prior art scheme which could result in an improper sequence of operation.

SUMMARY OF THE INVENTION

A step logic sequencer is included for controlling the speed changes in a two-speed pole-amplitude-modulated (PAM) motor system. The step logic sequencer provides control signals in sequence to the PAM motor system such that a subsequent control signal is provided after a confirmation signal is received in the step logic sequencer from the PAM motor system.

More particularly, digital demand means are included responsive to the presence of a plurality of signals for providing a trigger signal to initiate a sequence of control signals in the step logic sequencer. A first control or command signal is provided to the PAM motor system by the step logic sequencer upon the presence of the trigger signal and of certain confirmation signals. A second command or control signal is provided by the step logic sequencer after the step logic sequencer receives a signal confirming the actual response of the PAM motor system to the first control or command signal. Generally, subsequent control signals will be provided by the step logic sequencer upon confirmation of an actual response to the immediately prior command or control signal. The step logic sequencer, in one embodiment, includes sequential multiple logic modules, the output of each of which logic modules is a logic AND function of its inputs. The output of each logic module is a control signal for operating the PAM motor system. A confirmation signal confirming the status of the PAM motor system or confirming the response thereof to a control signal is input to each of the logic modules.

DESCRIPTION OF THE PREFERRED EMBODIMENT

Figure 1:
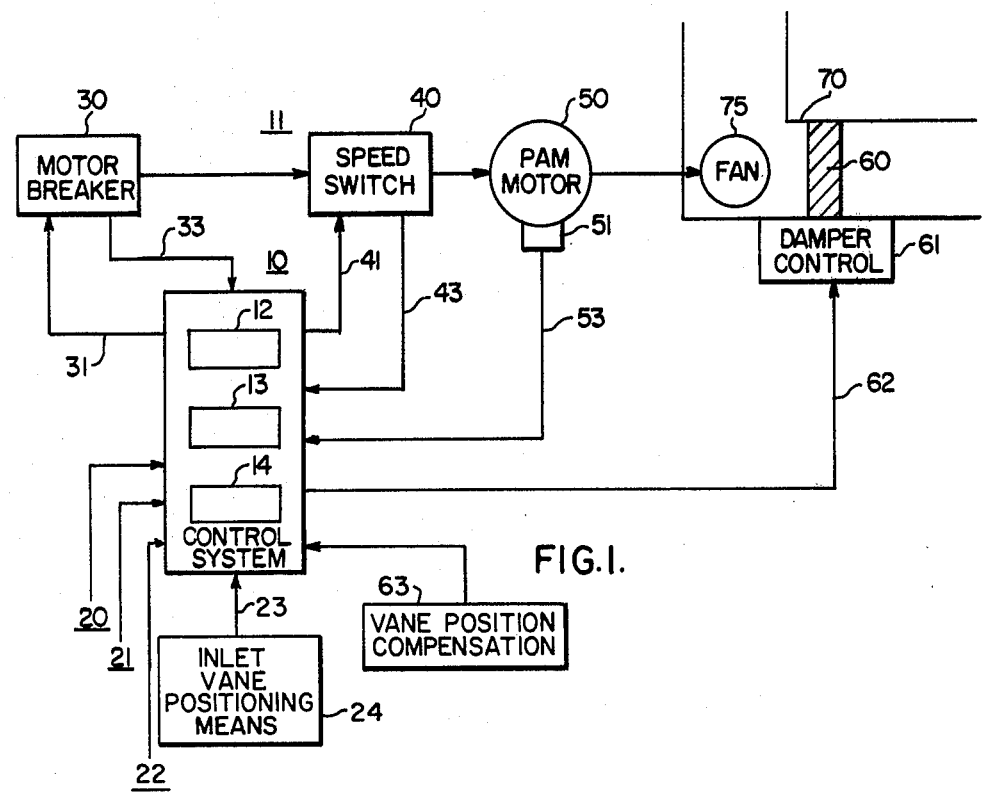
FIG. 1 is a generalized block diagram of a control system according to the teachings of the present invention.

FIG. 1 shows a generalized block diagram of a control system 10 and a motor system 11 according to the teachings of the present invention. The motor system 11 includes a motor breaker 30 coupled to a speed switch 40. A pole-amplitude-modulated (PAM) motor 50 having a set of motor windings therein is coupled between the speed switch 40 and a fan 75. The fan 75 is situated in a duct 70. A damper 60 having a damper control 61 is also included in the duct 70 for controlling the air flow therein.

The speed switch 40 includes two speed positions, namely, a low-speed position and a high-speed position and is coupled to the PAM motor 50 such that the set of motor windings is configured differently depending upon the speed position setting of the speed switch 40. The speed switch 40 can be, for example, an electric switch suitable for such purpose made by the ESCO Electric Supply Co.

The control system 10 includes three operating modules 12, 13, and 14. The operating module 12 is a start sequencer module for assuring that the correct sequence in the motor system 11 is followed in starting the motor 50. The operating module 13 is a transfer-high sequencer module for assuring that the correct sequence in the motor system 11 is followed when increasing the speed of the motor 50 from a low speed to a high speed. The operating module 14 is a transfer-low module for assuring that the correct sequence in the motor system 11 is followed when changing the speed of the motor 50 from a high speed to a low speed.

According to the teachings of the present invention, the control system 10 includes means therein for generating control signals 31 and 41 for, respectively, operating (opening and closing) the motor breaker 30 and changing the speed position of the speed switch 40. A control signal 62 is also included for controlling the damper control 61.

The motor breaker 30 includes means therein for generating a confirmation signal 33 in response to the control signal 31 in order to confirm that the motor breaker 30 has responded to the control signal 31. The speed switch 40 includes means therein for generating a confirmation signal 43 in order to confirm that the speed switch 40 has responded to the control signal 41. The motor 50 includes means therein, including a speed transducer 51, for generating a confirmation signal 53 for confirming or indicating the speed of the motor 50.

A set 20 of external permissive signals is coupled to the start sequencer module 12 such that the control system 10 will not start the motor 50 unless all of the set 20 of external permissive signals are present. A set 21 of permissive external signals is coupled to the transfer-high sequencer module 13 for preventing a transfer of the speed position of the speed switch 40 from the low-speed position to the high-speed position unless all of the set 21 of external permissive signals are present. A set 22 of external permissive signals is coupled to the transfer-low sequences module 14 for preventing a transfer of the speed position of the speed switch 40 from the high-speed position to the low-speed position unless all of the set 22 of external permissive signals are present. The sets 20, 21, and 22 of external permissive signals are generally signals external to the control system 10 or to the motor system 11 indicating external conditions desired or required in order to permit the operation of the control system 10.

A vane position compensation means 63 is included in the control system 10 for providing the damper control signal 62 in response to an inlet vane positioning signal 23. The positioning signal 23 is provided by an inlet vane positioning means 24.

Figure 2:
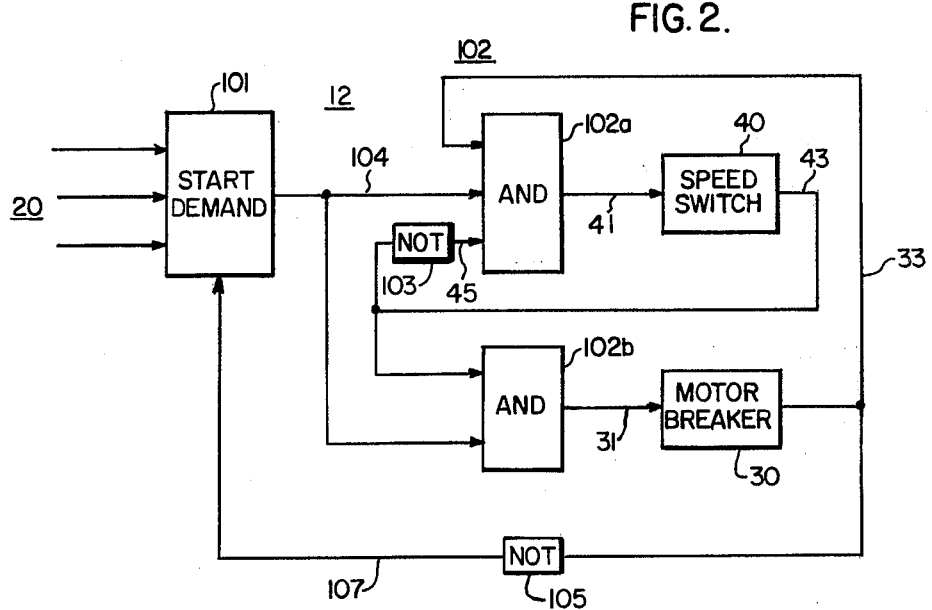
FIGS. 2 through 6 are more detailed block diagrams of subsystems included in the control system of FIG. 1.

When it is desired to turn the PAM motor 50 from the off condition, the operation of the start sequence module 12 is triggered. This can be done manually, for example, with a manual switch or push-button or automatically using electronics and digital logic. FIG. 2 shows a block diagram of the start sequencer 12 of FIG. 1 in its broadest aspects. In FIG. 2, the start sequencer 12 includes a start demand module 101 responsive to the presence of the set 20 of permissive signals for providing a start-trigger signal 104. The start demand module 101 may be, for example, a digital flip-flop circuit gated at the input with a digital AND gate. Logic AND gates 102a and 102b and a NOT gate 103 are included for assuring that the motor breaker 30 is in the open position before the speed position of the switch 40 is changed. The confirmation signal 33 and the start-trigger signal 104 are coupled to the input of the AND gate 102a. The confirmation signal 43 is inverted by the NOT gate 103 and the resulting inverted signal 45 is coupled to the input of the AND gate 102a. The start-trigger signal 104 and the confirmation signal 43 are coupled to the input of the AND gate 102b. The confirmation signal 33 is also inverted by a logic NOT gate 105 for providing an indicator signal 107.

In operation of the start sequencer 12 of FIG. 2, the confirmation signals 33 and 43 are digital logic signals designed such that when the speed switch 40 is at the low-speed position, the output thereof is a logic "1" and when the speed switch 40 is in a high speed position, the confirmation signal 43 is a logic "0". When the motor breaker 30 is in the open position, the output thereof, that is the confirmation signal 33, is a logic "1" and when the motor breaker 40 is in the closed position, the confirmation signal 33 is a logic "0".

In operation of the start sequencer module 102 of FIG. 2, the start demand module 101 flip-flop is set, that is, it is responsive to the presence of the set 20 of signals for providing the start-trigger signal 104. When the motor breaker 30 is in the open position, the confirmation signal 33 will be a logic "1". When the speed switch 40 is in the high speed position, the confirmation signal 43 will be a logic "0" and the signal 45 will be a logic "1". Under these conditions, that is, where all of the logic inputs to the sequencer module 102a are a logic "1", the sequence module 102a will provide the control signal 41 for changing the speed position of the speed switch 40 to the low-speed position.

When the speed position of the speed switch 40 is confirmed in the low-speed position, that is when the confirmation signal 43 is a logic "1", the signal 45 becomes a logic "0" and the control signal 41 is removed from the speed switch 40 in response thereto. In addition, when the confirmation signal 43 is a logic "1", the sequencer module 102b will provide the control signal 31 for closing the motor breaker 30. When the motor breaker 30 is in the closed position, the resulting logic "0" signal is inverted by a logic NOT gate 105 for providing a start-demand reset signal 108 signal for resetting the start demand module.

Figure 3:
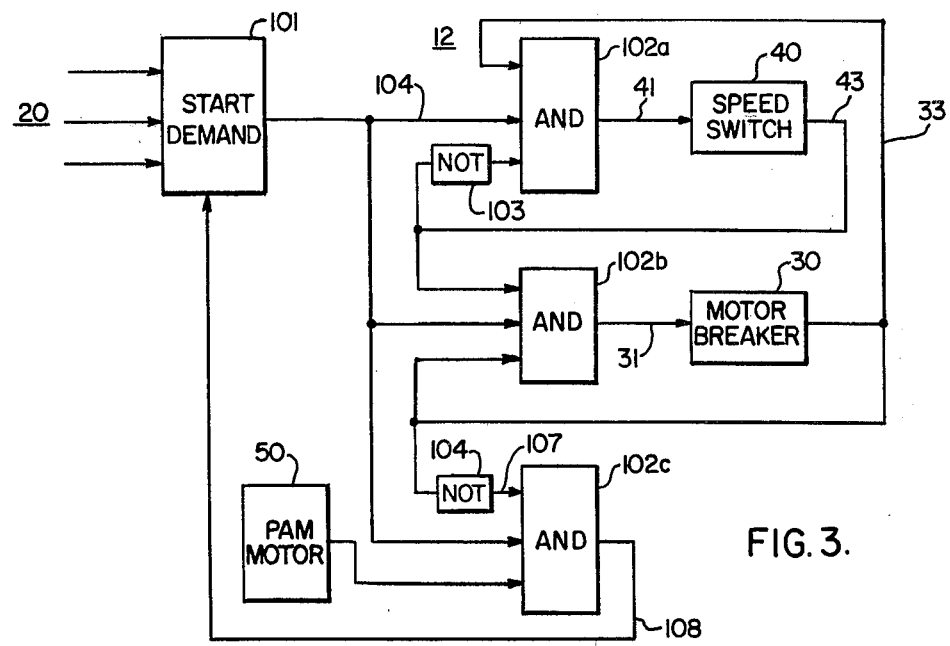

FIG. 3 shows the start-sequencer module 12 of FIG. 2 further including a sequencer module 102c for confirming the response of the motor 50 to the closing of the motor breaker 30. Similar reference characters are used in FIG. 3 to designate similar elements shown in FIG. 2. The confirmation signal 33 is coupled to the input of the sequencer module 102b and to the input of the sequencer module 102c by way of the NOT gate 104. The confirmation signal 53 from the motor 50 is also coupled to the input of the sequencer module 102c. The start-trigger signal 104 is also coupled to the input of the sequencer module 102c.

In operation of the start sequencer module 12 of FIG. 3, continuing from the explanation of the start sequencer module 12 of FIG. 2, when the motor breaker 30 is in the closed position, after the speed position of the speed switch 40 has changed, a logic "0" signal appears at the input of the sequencer module 102b and the control signal 31 is removed from the motor breaker 30 in response thereto. In addition, the logic "0" condition of the confirmation signal 33 is inverted by the NOT gate 104 and a resulting output signal 107 is a logic "1". When the motor 50 and the fan 75 accelerates to the low-speed velocity, the confirmation signal 53 will be a logic "1" and the sequencer module 102c will provide, in response thereto, the reset signal 108 for resetting the start-demand (flip-flop) thereby removing the start-trigger signal 104 and assuring that all the control signals 31 and 41 are disabled.

In one particular embodiment of the start sequencer 12 of FIGS. 2 and 3, the control signals 41 and 31 and the confirmation signal 33 and 43 are redundant. That is, there are separate control signals for opening and closing the motor breaker 40 and separate control signals for changing the speed position of the speed switch 40. Also, there are separate signals for confirming that the motor breaker 30 is closed or open and for confirming that the speed switch 40 is in the low speed or high speed position. Such redundancy would require a slightly different design from the design shown in FIGS. 2 and 3. But, it is to be understood that the necessary changes in design can be easily made by one of average skill in the art. The embodiments of the start sequencer module shown in FIGS. 2 and 3 are for the purpose of illustrating the broadest aspects of the present invention and do not in any way limit the other embodiments derived from the teachings of the present invention.

Figure 4:
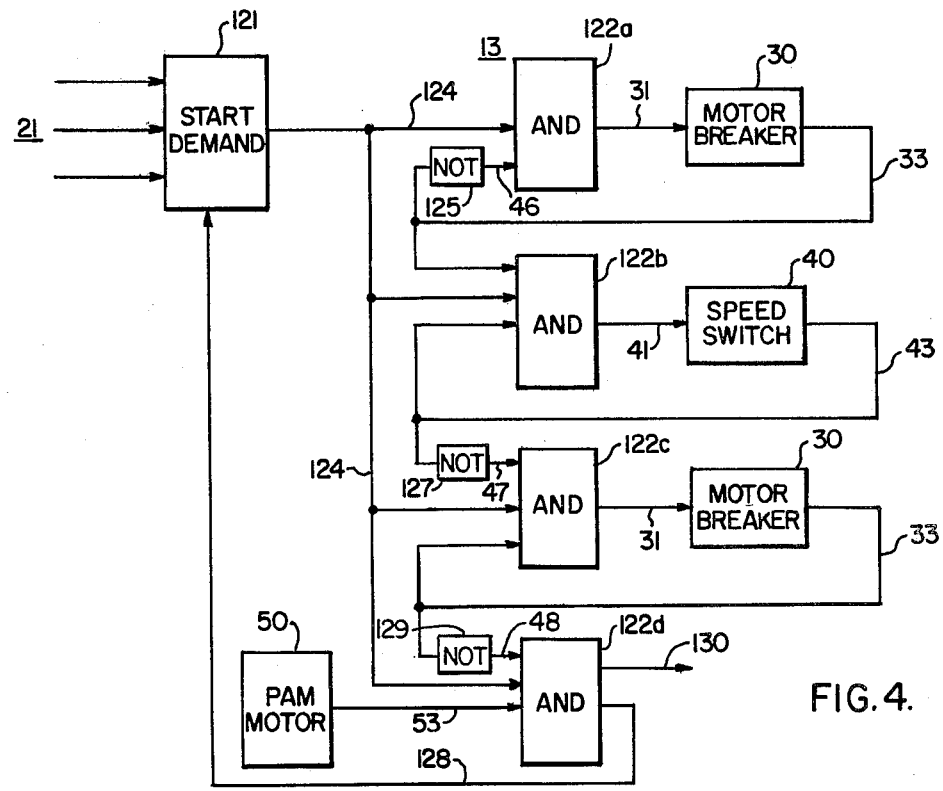

FIG. 4 shows a block diagram of the high-transfer sequencer module 13 of FIG. 1. The high-transfer sequencer module 13 of FIG. 4 includes a high-transfer demand module 121, and includes sequencer modules 122a, 122b, 122c, and 122d, all of which sequencer modules have output signals which are a logic AND function of the respective input signals. The high-transfer demand module 121 is responsive to a set 21 of signals for providing a high-transfer trigger signal 124. The confirmation signal 33 is inverted by a logic NOT gate 125 for providing an inverted confirmation signal 46. The confirmation signal 43 is inverted by a logic NOT gate 127 for providing an inverted confirmation signal 47. The confirmation signal 43 is also inverted by a logic NOT gate 129 for providing a signal 48.

The sequencer module 102a has inputs from signals 124 and 46 and provides the control signal 31 an output in cases where the input signals 124 and 46 are both a logic "1". The sequencer module 122b has inputs from the confirmation signals 33 or 43 and provides the control signal 41 in cases where the confirmation signal 33 and 43 are both a logic "1". The sequencer module 122c has inputs from the signals 47 and 43 and provides the control signal 31 for closing the motor breaker 30 in cases where the signals 47 and 33 are both a logic "1". The sequencer module 122d has inputs from the signals 48 and 53 and provides an indicator signal 130 and a high transfer-reset signal 126 in cases where the input signals 48 and 53 are both a logic "1".

When it is desired to change the speed of the fan 75 to a high-speed velocity from the low-speed velocity, the operation of the high-transfer module 13 of FIG. 4 is triggered for changing the speed position of the speed switch 40 from the low-speed position to the high-speed position. This can be done manually, for example, with a manual switch on push-button or automatically using electronics and digital logic. Generally, it is desired that the motor breaker 30 be in the open position before the speed position of the speed switch 40 is changed to the high speed position. The motor breaker 30 can then be closed and the motor 50 allowed to accelerate the fan 75 to the high-speed angular velocity as determined by the connection of the speed switch 40 to the motor windings of the PAM motor 50.

In explanation of the operation of the high-transfer sequencer module 13 of FIG. 4, the same logic design conditions exists with respect to the control signals 31 and 41 and the confirmation signals 33 and 43 as discussed above in reference to the start sequencer module 12 of FIGS. 2 and 3. The high-transfer demand module 121 provides the high-transfer trigger signal 124 in response to the presence at the input of the high-transfer demand module 121 of the set 21 of permissive signals. That is, under these conditions, the high-transfer trigger signal 124 is a logic "1". If the motor breaker 30 is in the closed position, the signal 46 will be a logic "1" and the sequencer module 122a will provide the control signal 31 for opening the motor breaker 30. If the motor breaker 30 is already in the open position, then the signal 46 will be a logic "0" and the control signal 31 will not be generated. However, under such conditions, both of the inputs to the sequencer module 122b are a logic "1" since the speed switch 40 is in the low-speed position.

After the motor breaker 30 is confirmed to be in the open position, that is, when the confirmation signal 33 is a logic "1", the control signal 31 is generated by the sequential module 122b for changing the speed position of the speed switch 40 from the low-speed position to the high-speed position. When the position of the speed switch 40 is changed to the high-speed position, the confirmation signal 43 will be a logic "0" and the control signal 41 will be removed. In addition, the signal 47 will be a logic "1" and, since the motor breaker 30 has already been confirmed to be in the open position, the control signal 33 will also be a logic "1". Under such conditions, the control signal 31 is generated by sequential module 122c for closing the motor breaker 30. When the motor breaker 30 is closed, the confirmation signal 33 will be a logic "0" and the signal 48 will be a logic "1".

When the motor 50 and the fam 75 has accelerated from the low-speed velocity to the high-speed velocity, after a period of time, the confirmation signal 53 will be a logic "1" (by design) and the sequencer module 122d will generate in response thereto the indicator signal 130 and a high-transfer reset signal 128. The high-transfer signal 128 is effective to reset the high-transfer demand module (flip-flop) 121 for removing the high-transfer trigger signal 124 and assuring that all the control signal are disabled.

Figure 5:
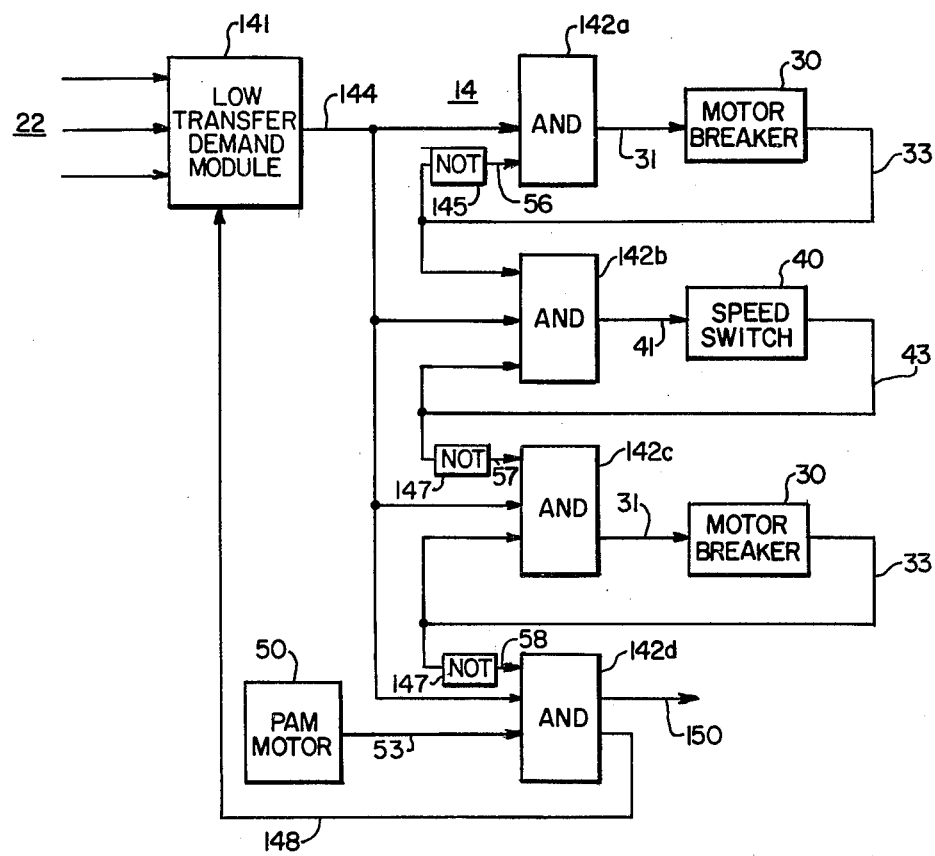

FIG. 5 shows a block diagram of the low-transfer operating module 14 of FIG. 1. In FIG. 5, the low-transfer operating module 14 includes a low-transfer demand module 141, sequencer modules 142a, 142b, 142c, and 142d, and logic NOT gates 145, 147, and 149. The low-transfer demand module 141 and the sequencers 142 are all modules, the outputs of which are logic AND functions of the inputs thereto. Signals 56 and 58 are logic inversions of the confirmation signal 33 provided by NOT gates 145 and 147, respectively, and a signal 57 is the logic inversion of the confirmation signal 43 provided by NOT gate 149.

The sequencer modules 142 operate logically in the same manner as the sequencer modules of FIGS. 2, 3, and 4. The sequencer module 142a generates a control signal 231 for opening the motor breaker 30 in response to the appropriate logic conditions of the signal 56 and a low-transfer trigger signal 144. The sequencer module 142b will generate a control signal 241 for changing the speed position of the speed switch 40 from the high-speed position to the low-speed position in response to the appropriate logic condition of the signals 144, 33, and 43. The sequencer module 142c will provide the control signal 231 for closing the motor breaker 30 in response to the appropriate logic condition of the signals 144, 57, and 33. The sequencer module 142d will provide an indicator signal 150 and a low-transfer reset signal 148 in response to the appropriate logic condition of the signal 144, 58, and 53. The low-transfer reset signal 148, when generated, is for the purpose of removing the signal 144 by resetting the low-transfer demand module (flip-flop) 141.

According to the teachings of the present invention, means are included for aborting the transfer from the low-speed velocity of the motor 50 to the high-speed velocity of the motor 50 as explained in reference to FIG. 4 under conditions where the transfer is faulty. Means are also included for aborting the transfer from the high-speed velocity of the motor 50 to the low-speed velocity of the motor 50 as referred to in reference to FIG. 5 under conditions where the transfer is faulty. A faulty transfer is one where a response of the motor system 11 of FIG. 1 to a control signal is not confirmed within a predetermined period of time either because of a mechanical, electronic or other cause of failure.

In each case of the aborting means, the control system 10 aborts back to system conditions appropriate for the speed from which it was attempting to change. That is, a faulty transfer when attempting to change from the low-speed velocity to the high-speed velocity will cause the control system 10 to abort back to system conditions appropriate for the low-speed velocity. A faulty transfer when attempting to change from the high-speed velocity to the low-speed velocity will cause the control system 10 to abort back to system conditions appropriate for the high-speed velocity.

Figure 6:
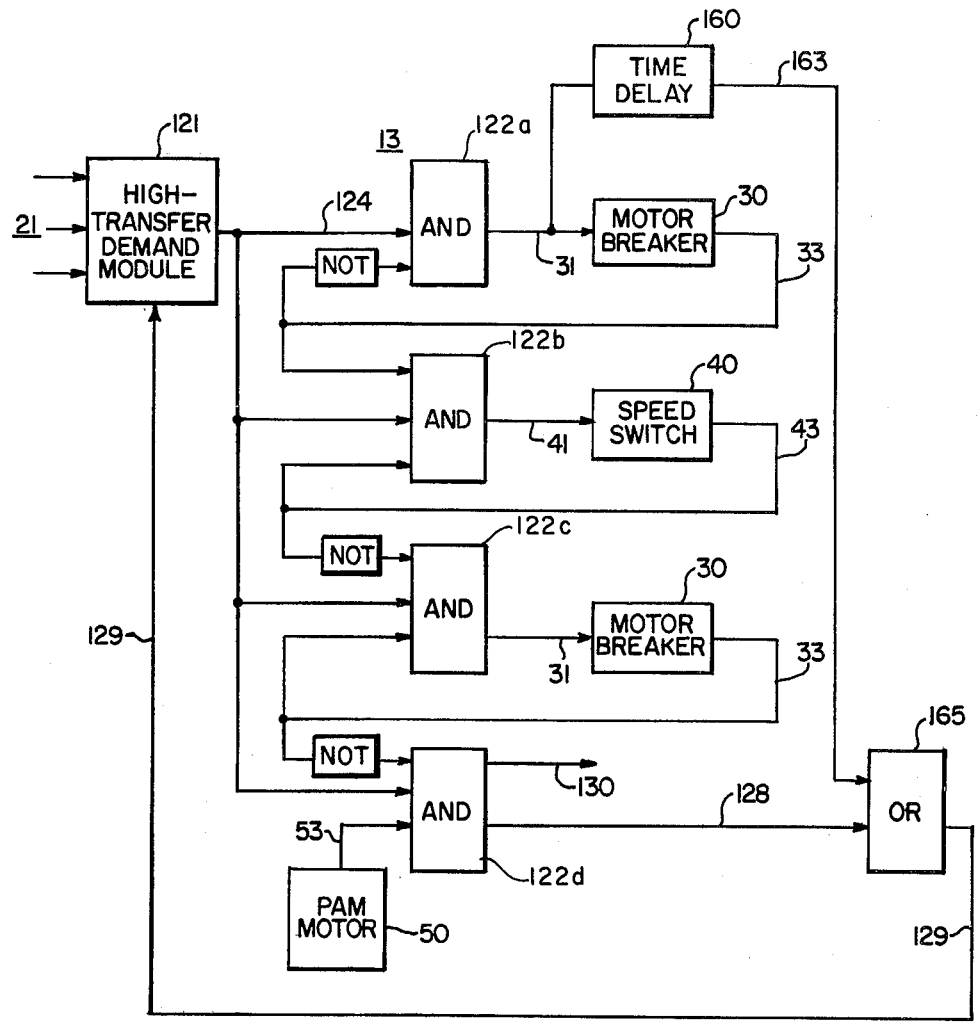

FIG. 6 shows for example, the high-transfer sequencer module 13 of FIG. 4 including means, including time-delay means 160, coupled to the output of the sequencer module 122a for aborting the speed transfer under specified conditions. The time-delay means 160 is shown as coupled only to the output of the sequencer module 122a for illustrative purposes only. It is to be understood that a similar aborting means is coupled to the outputs of the sequencer modules 122b and 122c of FIG. 4, to the outputs of the sequencer modules 142a, 142b, and 142c of FIG. 5, and the output of the sequencer modules 102a of FIGS. 2 and 3.

The aborting means in FIG. 6 includes a logic OR gate 165 and the time delay means 160 which time delay means 160 is triggered by the control signal 31 and provides an output signal 163 after a predetermined period of time for resetting the high-transfer demand module (flip-flop) 121 in response to a reset signal 129. If the control signal 31 is removed before the predetermined time period, the aborting means 160 will not provide the output signal 163.

In operation of the aborting means 160, the control signal 31 triggers the timing mechanism in the time delay means 160. If the motor breaker 30 responds to the control signal 31 and the confirmation signal 33 indicates that the motor breaker 30 is in the open position, the control signal 31 will be removed. If the control signal 31 is removed within the specified time period of the aborting means 160, there will be no output provided from the aborting means 160. Otherwise, if the control signal 31 is not removed within the specified period of the aborting means 160, i.e., either the motor breaker didn't open or it opened but the confirmation signal 33 was never received by the sequencer module 122a, the transfer-abort signal 163 will be generated by the aborting means 160 and the control system 10 will abort back to the low-speed velocity of the motor 50 by resetting the module 121 and setting the module 141.

In addition to the output of the time-delay means 160, the reset signal 128 is coupled to the input of the OR gate 165 for resetting the high-transfer demand module (flip-flop) after proper completion of the sequence of operation of the sequencer 13. An alarm signal (not shown) may easily be generated from the transfer-abort signal 163 in order to indicate that a transfer malfunction has occurred.

Figure 7:
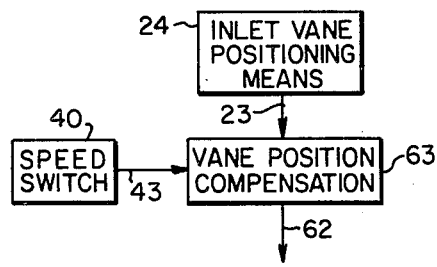
FIG. 7 is a generalized block diagram of a damper position compensation means according to the teachings of the present invention.

It is desired that the air flow in the duct 70 of FIG. 1 be maintained at a constant pressure at either of the two speeds at which the PAM motor 50 runs the fan 75 of FIG. 1. Pursuant thereto, FIG. 7 shows, generally, vane position compensation means 63, included in the control system 10. The compensation means 63 is generally responsive to confirmation signal 43 and to inlet vane positioning signal 23 for providing the damper control signal 62.

Figure 8:
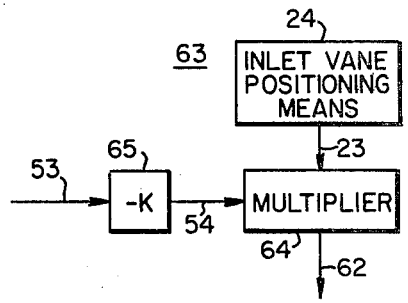
FIGS. 8 and 9 are block diagrams of different embodiments of the damper position compensation means of FIG. 7.

FIG. 8 shows an embodiment of a vane position compensation means 63, particularly, suited to use with damper control means 61 having a fast-responding mechanism (for example, a pneumatic cylinder) for driving the damper 60. In FIG. 8, the compensation means 63 includes a multiplier 64 responsive to an inverse confirmation signal 54 and to the inlet vane positioning signal 23 for providing the damper control signal 62. An inverse ranger 65 is included for providing the inverse signal 54 in response to input of the confirmation signal 53. The inverse ranger 65 includes means for inverting the voltage of the signal 53. That is, as the voltage of the signal 53 goes from 0 V to 10 V, the inverse ranger 65 provides a signal 54 which goes from 10 V to 0 V. For example, when the signal 53 is at 0 V, the signal 54 is at 10 volts and when the signal 53 is at 10 V, the signal 54 is at 0 V.

The inlet vane positioning means 24 includes means for determining the position of the damper 60 to give the desired measure of air flow in the duct 70 when the fan 75 of FIG. 1 is running at high speed. The signal 54 of FIG. 8 is operative to open the damper 60 when the speed of the motor 75 of FIG. 1 decreases to the low speed velocity in order to maintain the desired air flow in duct 70 when the fan 75 is at low speed.

Figure 9:
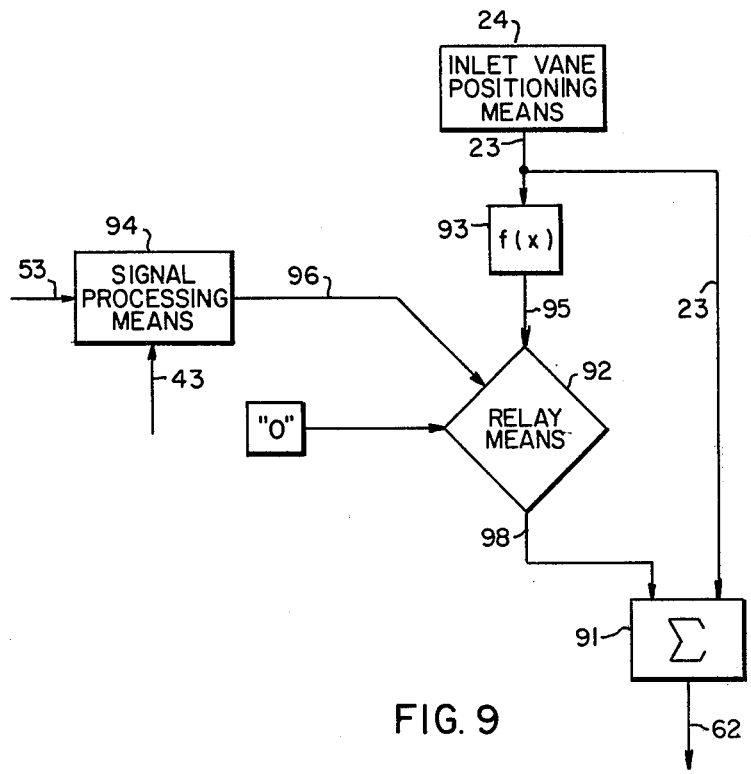

FIG. 9 shows an embodiment of the vane position compensation means 63 of FIG. 7 especially suited to slow drive mechanisms, for example, electric motor drives. In FIG. 9, the vane position compensation means 63 includes summing means 91, relay means 92, signal function means 93, and the inlet vane positioning means 64. The signal function means 93 provides a function signal 95 in response to the inlet vane positioning signal 23. The signal processing means 94 provides a control signal 96 in response to the logic AND of the confirmation signals 43 and 53 for controlling the relay means 92 such that when the motor speed confirmation signal 53 and the confirmation signal 43 indicate a low speed velocity in the PAN motor 50, the relay means 92 will couple the function signal 95 to the summing means 91 such that a relay signal 98 output from the relay means 92 is the same as the function signal 95. When the motor confirmation signal 53 indicates a high speed velocity in the PAM motor 50, the control signal 96 will control the relay means 92 such that there is no signal coupled to the summing means 91 or alternatively a signal 97 having zero magnitude is coupled to the summing means 91.

What I claim is:

1. A control system for controlling the speed of a motor system having a pole-amplitude-modulated (PAM) motor which includes a set of windings which can be connected in different configurations to produce respectively different motor operating speeds; said control system comprising:
   switching means for connecting the motor windings in a low speed configuration in one switch state and for connecting the motor windings in a high speed configuration in a second switch position;
   breaker means for coupling the motor windings to a power source;
   sequencer means for changing the motor speed on demand when predetermined permissive conditions exist, said sequencer means in sequence opening said breaker means if it is closed and operating said switching means to configure the motor winding for the demanded speed and closing said breaker means to enable the motor to be moved to the demand speed; and
   means for generating confirmation signals for the state of at least said switch means and said breaker means to advance the operation of said sequencer means during a motor speed change.

2. A control system according to claim 1 further including aborting means, said aborting means responsive to said sequencer means for aborting said speed change under a predetermined condition and causing said switching means PAM motor to continue in its pre-existing speed state.

3. A control system according to claim 2 wherein said aborting means includes time delay means responsive to the presence for a predetermined period of time of one of said control signals for aborting said speed change and causing switching means and said PAM motor to continue in its pre-existing speed state.

4. A control system for controlling the speed of a motor system having a pole-amplitude-modulated (PAM) motor, said control system comprising:
   a. starting means responsive to the presence of a first set of initiation signals for providing a first trigger signal;
   b. start sequencer means having first, second, and third circuit means, for causing a speed change in said PAM motor from a present speed to a different speed said start sequencer means including:
      means including said first circuit means responsive to said first trigger signal and to a first set of confirmation signals to enable said first circuit means for providing a first control signal, means responsive to said first command signal for providing a second set of confirmation signals effective to disable said first circuit means and effective to enable said second circuit means for providing a second control signal, means responsive to said second control signal for providing third set of confirmation signals effective to disable said second circuit means and effective to enable said third circuit means for providing a third control signal;
   c. speed change start means responsive to the presence of a second set of initiation signals for providing a second trigger signal;
   d. speed change sequencer means having fourth, fifth, sixth, and seventh circuit means, means responsive to said second trigger signal and to a fourth set of confirmation signals to enable said first circuit means for providing a fourth control signal, means responsive to said fourth control signal for providing a fifth set of confirmation signals effective to disable said fourth circuit means and effective to enable said fifth circuit means for providing a fifth control signal, means responsive to said fifth control signal for providing a sixth set of confirmation signals effective to disable said fifth circuit means and effective to enable said seventh circuit means for providing a sixth control signal, means responsive to said sixth control signal for providing a seventh set of confirmation signals effective to disable said sixth circuit means and effective to enable said eighth circuit means for providing a seventh control signal.

5. A control system according to claim 4 further including aborting means, said aborting means including time delay means responsive to the presence, for a period of time, of one of said control signals for causing said PAM motor to continue at said present speed.

6. A control system for controlling the speed of a pole-amplitude-modulated (PAM) motor in a motor system, said motor system having a damper, a fan, a motor breaker, a signal switch coupled to said motor breaker, said fan revolving in response to revolutions of said PAM motor, said control system comprising:
   a. starting means including a first digital bistable circuit (flip-flop) responsive to the presence of a plurality of start permissive signals for providing a start demand signal;
   b. start sequencer means having first, second, and third circuit means each including an AND gate for initiating angular motion in said PAM motor, said start sequence means including:
      means including said first circuit means and including a first NOT gate responsive to said start demand signal and to a first start confirmation signal and to the absence of a second start confirmation signal for providing a first switch control signal, means including said signal switch responsive to said first switch control signal for providing said second start confirmation signal, means including said first NOT gate responsive to said second start confirmation signal for disabling said first circuit means, means including said second circuit and including a second NOT gate responsive to said second start confirmation signal for providing a first motor breaker control signal, means including said motor breaker responsive to said first motor breaker control signal for providing a third start confirmation signal for disabling said second circuit means, means including said third circuit means responsive to said third start confirmation signal and to a fourth start confirmation signal from said PAM motor for providing a start indication signal;
   c. speed change start means including a second flip-flop responsive to the presence of a plurality of speed change permissive signals for providing a speed change demand signal;
   d. speed change sequence means having fourth, fifth, and sixth circuit means each including an AND gate for changing the velocity of angular motion in said PAM motor, said speed change sequencer including:
      means including a third NOT gate and including said fourth circuit means responsive to said speed change demand signal and to a first speed change confirmation signal and to the absence of a third speed change confirmation signal for providing a second motor breaker control signal, means including said motor breaker responsive to said second motor breaker control signal for providing said third speed change confirmation signal, means including said third NOT gate responsive to said third speed change confirmation signal for disabling said fourth circuit means, means including a fifth NOT gate and including said fifth circuit means responsive to said third speed change confirmation signal and to the absence of a fourth speed change confirmation signal for providing a second signal switch control signal, means including said signal switch responsive to said second signal switch command signal for providing said fourth speed change confirmation signal, means including said fifth NOT gate for disabling said fifth circuit means, means including said sixth circuit means and including a fifth NOT gate responsive to said fourth speed change confirmation signal and to the absence of a fifth speed change confirmation signal for providing a third motor breaker control signal, means including said motor breaker control signal for providing said fifth speed change confirmation signal, means including said fifth NOT gate responsive to said fifth speed change confirmation signal for disabling said sixth circuit means, means including said seventh circuit means responsive to said fifth speed change confirmation signal and to a sixth speed change confirmation signal from said PAM motor for providing a speed change indication signal.

7. A control system according to claim 6 further including:
  means including a first time delay means responsive to the presence for a predetermined period of time of any one of said control signals for resetting said first digital flip-flop and setting said second digital flip-flop.

8. A control system as set forth in claim 1 wherein means are provided for responding to a predetermined process condition to generate a signal for automatically triggering a motor speed change, and means for coupling the automatic trigger signal to said sequencer means to initiate the demanded change in the state of said switching means.

9. A control system as set forth in claim 8.

10. A control system as set forth in claim 1 wherein the motor is a two speed PAM motor and said switching means has a low speed state and a high speed state.

11. A control system as set forth in claim 1 wherein a damper is associated with a fan driven by the PAM motor, and means are provided for driving the damper to compensate damper position during motor speed changes.

12. A control system as set forth in claim 1 wherein the confirmation signals also include a motor speed signal.

13. A control system as set forth in claim 12 wherein abort means are provided for operating said sequencer means to keep or restore said switching means in its pre-existing state if the state of said confirmation signals indicate under predetermined conditions a failure of the sequential operation.

* * * * *